US010116745B2

United States Patent
Desai et al.

(10) Patent No.: US 10,116,745 B2
(45) Date of Patent: Oct. 30, 2018

(54) AUTOMATIC CLIENT-SERVER ROLE DETECTION AMONG DATA STORAGE SYSTEMS IN A DISTRIBUTED DATA STORE

(71) Applicant: Samsung Electronics Co., Ltd., Suwon-si, Gyeonggi-do (KR)

(72) Inventors: Hiren Desai, San Jose, CA (US); Manoj K Guthula, Los Altos, CA (US); Purvaja Narayanaswamy, Santa Clara, CA (US)

(73) Assignee: Samsung Electronics Co., Ltd. (KR)

( * ) Notice: Subject to any disclaimer, the term of this patent is extended or adjusted under 35 U.S.C. 154(b) by 150 days.

(21) Appl. No.: 15/183,682

(22) Filed: Jun. 15, 2016

(65) Prior Publication Data
US 2017/0279891 A1    Sep. 28, 2017

Related U.S. Application Data

(60) Provisional application No. 62/314,280, filed on Mar. 28, 2016.

(51) Int. Cl.
| | | |
|---|---|---|
| *H04L 12/911* | (2013.01) | |
| *H04L 29/08* | (2006.01) | |
| *H04L 29/06* | (2006.01) | |
| *H04L 12/24* | (2006.01) | |

(52) U.S. Cl.
CPC ......... *H04L 67/1097* (2013.01); *H04L 41/12* (2013.01); *H04L 67/42* (2013.01)

(58) Field of Classification Search
CPC ...... H04L 67/1097; H04L 67/42; H04L 41/12
See application file for complete search history.

(56) References Cited

U.S. PATENT DOCUMENTS

| | | | |
|---|---|---|---|
| 5,712,981 A * | 1/1998 | McKee | H04L 41/5035 709/224 |
| 7,130,621 B2 | 10/2006 | Blawat et al. | |
| 7,493,371 B1 * | 2/2009 | Bali | H04L 67/14 709/203 |
| 7,801,895 B2 | 9/2010 | Hepper et al. | |
| 8,782,266 B2 | 7/2014 | Daniel | |
| 8,849,977 B2 | 9/2014 | Kristiansson et al. | |
| 2003/0169775 A1* | 9/2003 | Fan | H04L 63/1458 370/503 |

(Continued)

*Primary Examiner* — Scott B Christensen
(74) *Attorney, Agent, or Firm* — Innovation Counsel LLP (57) ABSTRACT

A data storage system configured as node in a distributed data store is presented. The system comprises an RDMA-enabled network adapter and a role management unit. The RDMA-enabled network adapter is configured to communicate with one or more other data storage systems in the distributed data store. The role management unit is configured to: detect a node identification number associated with each of the other data storage systems, compare a node identification number assigned to the data storage system with each of the detected node identification numbers to generate comparison results, determine whether the data storage system is to perform either a server role or a client role with respect to each of the other data storage systems on the basis of the comparison results, and set up the network adapter to operate in both an RDMA server mode and an RDMA client mode during runtime according to the determined roles.

18 Claims, 3 Drawing Sheets

(56) References Cited

U.S. PATENT DOCUMENTS

2006/0101225 A1* 5/2006 Aloni ................ H04L 12/4633
  711/202
2012/0275311 A1 11/2012 Ivershen et al.
2015/0161163 A1 6/2015 Cypher et al.

* cited by examiner

AUTOMATIC CLIENT-SERVER ROLE DETECTION AMONG DATA STORAGE SYSTEMS IN A DISTRIBUTED DATA STORE

CROSS-REFERENCE TO RELATED APPLICATIONS

This application claims priority to and the benefit of U.S. Provisional Patent Application No. 62/314,280, titled "System and Apparatus for Providing Auto Detection of Client-Server Role" and filed on Mar. 28, 2016, the entire content which is incorporated herein by reference.

RELATED FIELD

The present disclosure relates to a system and method of automatically detecting whether a data storage system provides a server role or a client role with respect to other data storage systems in a distributed data store.

BACKGROUND

A distributed data store is generally a computer network in which data is stored on a plurality of data storage systems. Each data storage system is often referred to as a node in the distributed data store. Distributed data stores are highly scalable and less costly to maintain because the nodes can be easily added, removed, or replaced. As a result, distributed data stores are often used in data centers.

Although distributed data stores have been implemented using traditional Ethernet networks and traditional client-server architectures, such distributed data stores often suffered from high latency unless sufficient server CPU cores were provisioned to satisfy peak loads. This meant that server CPUs needed to be upgraded continually over time to satisfy increasing load demands, or the server clients needed to wait for additional server CPU resources to be spun up during load spikes.

Remote direct memory access (RDMA) offers a solution to the high latency problem of traditional Ethernet networks and traditional client-server architectures. RDMA allows direct memory access from the memory of one computer into that of another without involving either one's operating system. This permits high-throughput, low-latency networking, which is especially useful in large, parallel computer clusters. In view of these benefits, RDMA-enabled distributed data stores are increasingly being adopted.

In a traditional RDMA-enabled distributed data store, a data storage system generally has a single role during runtime. Specifically, each data storage system, or node, is typically pre-configured to operate either as a client or a server with respect to the rest of the data storage systems in the distributed data store. For example, each data storage system may be manually assigned either a client role or a server role before runtime. Then, during runtime, each data storage system operates according to its pre-assigned role. This means that a data storage system operating in server mode listens for incoming RDMA connections from a client, and a data storage system operating in client mode initiates RDMA connections with a server.

SUMMARY

The present disclosure provides a data storage system configured as node in a distributed data store. According to an example embodiment, the system comprises an RDMA-enabled network adapter and a role management unit. The RDMA-enabled network adapter is configured to communicate with one or more other data storage systems in the distributed data store. The role management unit is configured to: detect a node identification number associated with each of the other data storage systems, compare a node identification number assigned to the data storage system with each of the detected node identification numbers to generate comparison results, determine whether the data storage system is to perform either a server role or a client role with respect to each of the other data storage systems on the basis of the comparison results, and set up the network adapter to operate in both an RDMA server mode and an RDMA client mode during runtime according to the determined roles.

The present disclosure also provides a method of operating a data storage system configured as node in a distributed data store. According to an example embodiment, the method comprises: detecting a node identification number associated with each of one or more other data storage systems in the distributed data store, comparing a node identification number assigned to the data storage system with each of the detected node identification numbers to generate comparison results, determining whether the data storage system is to perform either a server role or a client role with respect to each of the other data storage systems on the basis of the comparison results, and setting up a network adapter to operate in both an RDMA server mode and an RDMA client mode during runtime according to the determined roles.

The present disclosure also provides a non-transitory, computer-readable medium having stored thereon computer executable instructions. According to an example embodiment, when the instructions are executed by a computer processor of a data storage system configured as node in a distributed data store, the instructions cause the data storage system to: detect a node identification number associated with each of one or more other data storage systems in the distributed data store, compare a node identification number assigned to the data storage system with each of the detected node identification numbers to generate comparison results, determine whether the data storage system is to perform either a server role or a client role with respect to each of the other data storage systems on the basis of the comparison results, and set up a network adapter to operate in both an RDMA server mode and an RDMA client mode during runtime according to the determined roles.

BRIEF DESCRIPTION OF THE DRAWINGS

The accompanying drawings, which are included as part of the present disclosure, illustrate various embodiments and together with the general description given above and the detailed description of the various embodiments given below serve to explain and teach the principles described herein.

The figures in the drawings are not necessarily drawn to scale and elements of similar structures or functions are generally represented by like reference numerals for illustrative purposes throughout the figures. The figures are only intended to facilitate the description of the various embodiments described herein and do not describe every aspect of the teachings disclosed herein and do not limit the scope of the claims.

DETAILED DESCRIPTION

Each of the features and teachings disclosed herein may be utilized separately or in conjunction with other features and teachings to provide the present system and method. Representative examples utilizing many of these features and teachings, both separately and in combination, are described with reference to the attached figures. While the detailed description herein illustrates to a person of ordinary skill in the art further details for practicing aspects of the present teachings, it does not limit the scope of the claims. Therefore, combinations of features disclosed in the detailed description are representative examples of the present teachings and may not be necessary to practice the teachings in the broadest sense.

As used herein, "runtime" refers to the time period during which one or more of the data storage systems are operating together to provide the functionalities of a distributed data store. The data storage system being powered-on and booted into its operating system does not by itself mean that the data storage system is operating in runtime.

As mentioned earlier, in a traditional RDMA-enabled distributed data store, each data storage system is generally limited to a single role during runtime, either a server role or a client role. In contrast, the present disclosure provides a data storage system that is capable of performing dual roles during runtime. Specifically, the present disclosure provides a data storage system capable of operating as both an RDMA server and a RDMA client during runtime and a method of automatically detecting whether the data storage system operates as a server or a client with respect to each one of other data storage systems in the distributed data store.

In other words, a data storage system according to an example embodiment of the present system and method may perform the functions of a RDMA client with respect to certain ones of the data storage systems in a distributed data store and, in the same time period, perform the functions of a RDMA server with respect to other ones of the data storage systems in the distributed data store. Each data storage system may be assigned a node identification number prior to runtime, and the respective roles of two data storage systems (i.e., which one is client and which one is server) may be determined at runtime by comparing their corresponding node identification number with each other. An advantage of the present system and method is that the client-server role of each data storage system does not need to be configured prior to runtime.

Figure 1:
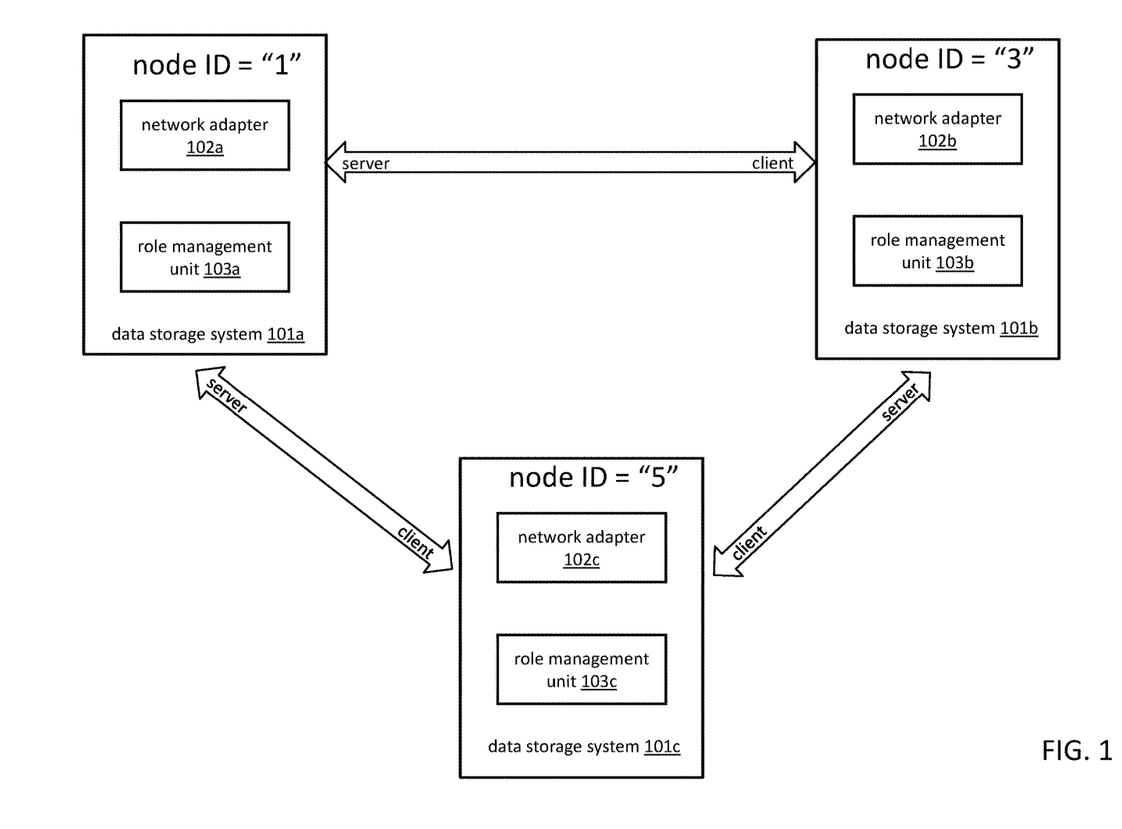
FIG. 1 is a block diagram of a distributed data store, according to an example embodiment of the present system and method.

FIG. 1 is a block diagram of a distributed data store, according to an example embodiment of the present system and method. FIG. 1 shows a distributed data store 101 having three data storage systems 101 (respectively labeled 101a, 101b, and 101c), but the present system and method are not limited thereto and may be applied to a distributed data store having any number of data storage systems. Each data storage system includes an RDMA-enabled network adapter 102 (respectively labeled 102a, 102b, and 102c) and a role management unit 103 (respectively labeled 103a, 103b, and 103c) and is associated with a unique node identification number (respectively numbered 1, 3 and 5).

The RDMA-enabled network adapter 102 of each data storage system is configured to communicate with that of other data storage systems in the distributed data store. Though the network adapters 102 are RDMA-enabled, the mode of communication between two data storage systems is not limited to just RDMA communication. For example, the data storage system 101a may communicate with each of the other data storage systems 101b and 101c using Transmission Control Protocol (TCP)/Internet Protocol (IP), in some cases, to ascertain their node identification numbers.

The role management unit 103, which may be implemented using known software methods, hardware elements, or a combination of both, is configured to determine the role of its corresponding data storage system with respect to each of the other data storage systems. The role management unit 103 is also configured to set up its corresponding RDMA-enabled network adapter 102 according to the determined roles.

To determine the role of the data storage system 101a with respect to the other data storage systems 101b and 101c, the role management unit 103a detects the node identification number of each of the data storage systems 101b and 101c. The role management unit 103a then compares the node identification number assigned to its corresponding data storage system 101a with each of the detected node identification numbers. In this case, wherein the data storage system with the lesser node identification number is assigned the server role, and the data storage system with the greater node identification number is assigned the client role, the role management unit 103a determines that its corresponding data storage system 101a is to perform the functions of a server with respect to both the data storage systems 101b and 101c since the node identification number ("1") of its corresponding data storage system 101a is less than both the detected node identification numbers ("3" and "5") of the data storage systems 101b and 101c. In an alternative embodiment, the data storage system with the greater node identification number may be assigned the server role, and the data storage system with the lesser node identification number may be assigned the client role.

The role management unit 103a then sets up its corresponding network adapter 102a according to the determined roles. In this case, because the data storage system 101a is to perform the functions of a server with respect to each of the other data storage systems 101b and 101c, the role management unit 103a may set up its network adapter 102a to listen for incoming RDMA connections from both of the data storage systems 101b and 101c.

In a similar fashion, the role management unit 103b determines the role of its corresponding data storage system 101b with respect to the other data storage systems 101a and 101c by detecting the node identification number of each of the data storage systems 101a and 101c. The role management unit 103b then compares the node identification number assigned to its corresponding data storage system 101b with each of the detected node identification numbers. In this case, because the node identification number ("3") of data storage system 101b is greater than that ("1") of the data storage system 101a and less than that ("5") of the data storage system 101c, the role management unit 103b determines that its corresponding data storage system 101b is to perform the functions of a client with respect to the data storage system 101a and the functions of a server with respect to the data storage system 101c.

The role management unit 103b then sets up its corresponding network adapter 102b according to the determined roles. In this case, because the data storage system 101b is to perform the functions of a server with respect to the data storage system 101c and the functions of a client with respect to the data storage system 101a, the role management unit 103b may set up its network adapter 102b to listen for incoming RDMA connections from the data storage system 101c and to initiate an RDMA reliable connection to establish a duplex communication channel with the data storage system 101a.

Also in a similar fashion, the role management unit 103c determines the role of the data storage system 101c with respect to the other data storage systems 101a and 101b by detecting the node identification number of each of the data storage systems 101a and 101b. The role management unit 103c then compares the node identification number assigned to its corresponding data storage system 101c with each of the detected node identification numbers. In this case, because the node identification number ("5") of data storage system 101c is greater than both the detected node identification numbers ("3" and "5") of the data storage systems 101a and 101b, the role management unit 103c determines that its corresponding data storage system 101c is to perform the functions of a client with respect to both the data storage systems 101a and 101b.

The role management unit 103c then sets up its corresponding network adapter 102c according to the determined roles. In this case, because the data storage system 101c is to perform the functions of a client with respect to each of the other data storage systems 101a and 101b, the role management unit 103c may set up its network adapter 102c to initiate an RDMA reliable connection to establish a duplex communication channel with each of the data storage systems 101a and 101b.

Though not shown in FIG. 1, if a fourth data storage system is dynamically added to the distributed data store 100 during runtime, the role management unit 103 of each of the existing data storage systems 101 may automatically detect the fourth data storage system and determine the role of its corresponding data storage system with respect to the fourth data storage system and set up its corresponding network adapter 102 according to the determined role using the method described above. Likewise, the role management unit 103 of the fourth data storage system may determine the role of the fourth data storage system with respect to each of the existing data storage systems and set up its corresponding network adapter 102 according to the determined roles.

Figure 2:
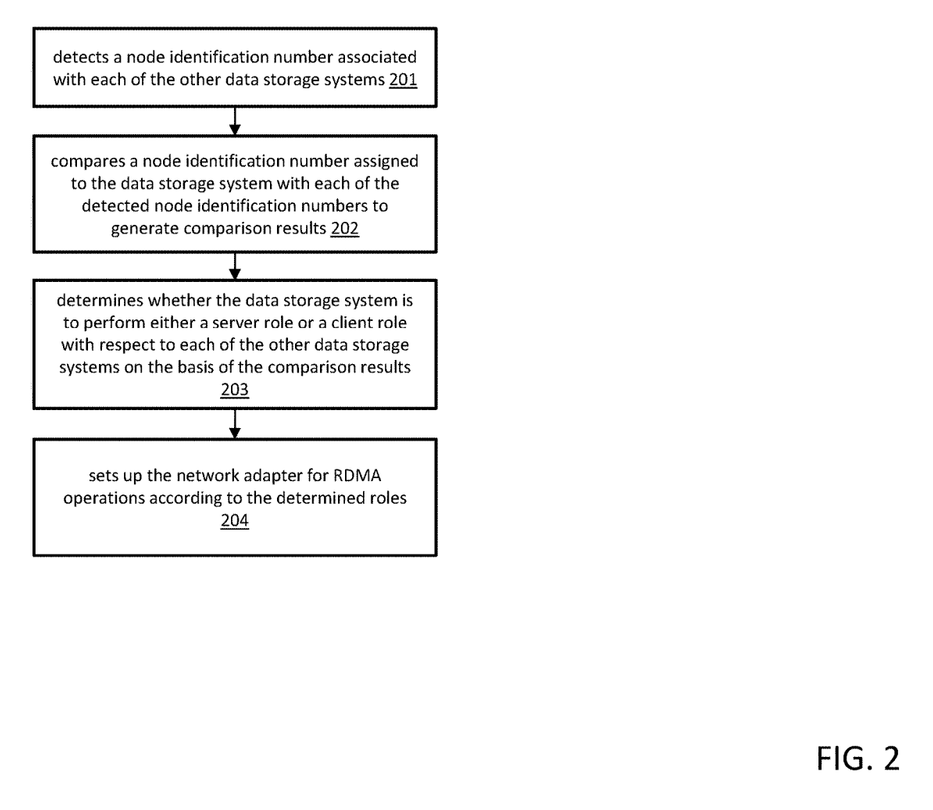
FIG. 2 shows a flowchart of the high-level operations of the role management unit of a data storage system in a distributed data store, according to an example embodiment of the present system and method.

FIG. 2 shows a flowchart of the high-level operations of the role management unit of a data storage system in a distributed data store, according to an example embodiment of the present system and method. The role management unit detects a node identification number associated with each of the other data storage systems in the distributed data store (at 201). The role management unit compares a node identification number assigned to the data storage system with each of the detected node identification numbers to generate comparison results (at 202). The generated comparison results may indicate whether the node identification number assigned to the data storage system is greater or less than each of the detected node identification numbers.

The role management unit then determines whether the data storage system is to perform either a server role or a client role with respect to each of the other data storage systems on the basis of the comparison results (at 203). As an example, the role management unit may determine that the data storage system is to perform a server role with respect to a first one of the other data storage systems if the node identification number assigned to the data storage system is less than the detected node identification number associated with the first one of the other data storage systems, and the role management unit may determine that the data storage system is to perform a client role with respect to a second one of the other data storage systems if the node identification number assigned to the data storage system is greater than the detected node identification number associated with the second one of the other data storage systems.

As an alternate example, the role management unit may determine that the data storage system is to perform a server role with respect to a first one of the other data storage systems if the node identification number assigned to the data storage system is greater than the detected node identification number associated with the first one of the other data storage systems, and the role management unit may determine that the data storage system is to perform a client role with respect to a second one of the other data storage systems if the node identification number assigned to the data storage system is less than the detected node identification number associated with the second one of the other data storage systems.

The role management unit sets up the network adapter for RDMA operations according to the determined roles (at 204). The role management unit may set up the network adapter to operate in both an RDMA server mode and an RDMA client mode during runtime according to the determined roles. Setting up the network adapter according to the determined roles may include initiating an RDMA reliable connection to establish a duplex communication channel with a first one of the other data storage systems if the data storage system is determined to perform a client role with respect to the first one of the other data storage systems. It may also include listening for incoming RDMA connections from a second one of the other data storage systems if the data storage system is determined to perform a server role with respect to the second one of the other data storage systems Thus, in summary, the present disclosure provides a data storage system capable of operating as both an RDMA server and a RDMA client during runtime and a method of automatically detecting whether the data storage system operates as a server or a client with respect to each one of other data storage systems in the distributed data store. An advantage of the present system and method is that the client-server role of each data storage system does not need to be configured prior to runtime.

Figure 3:
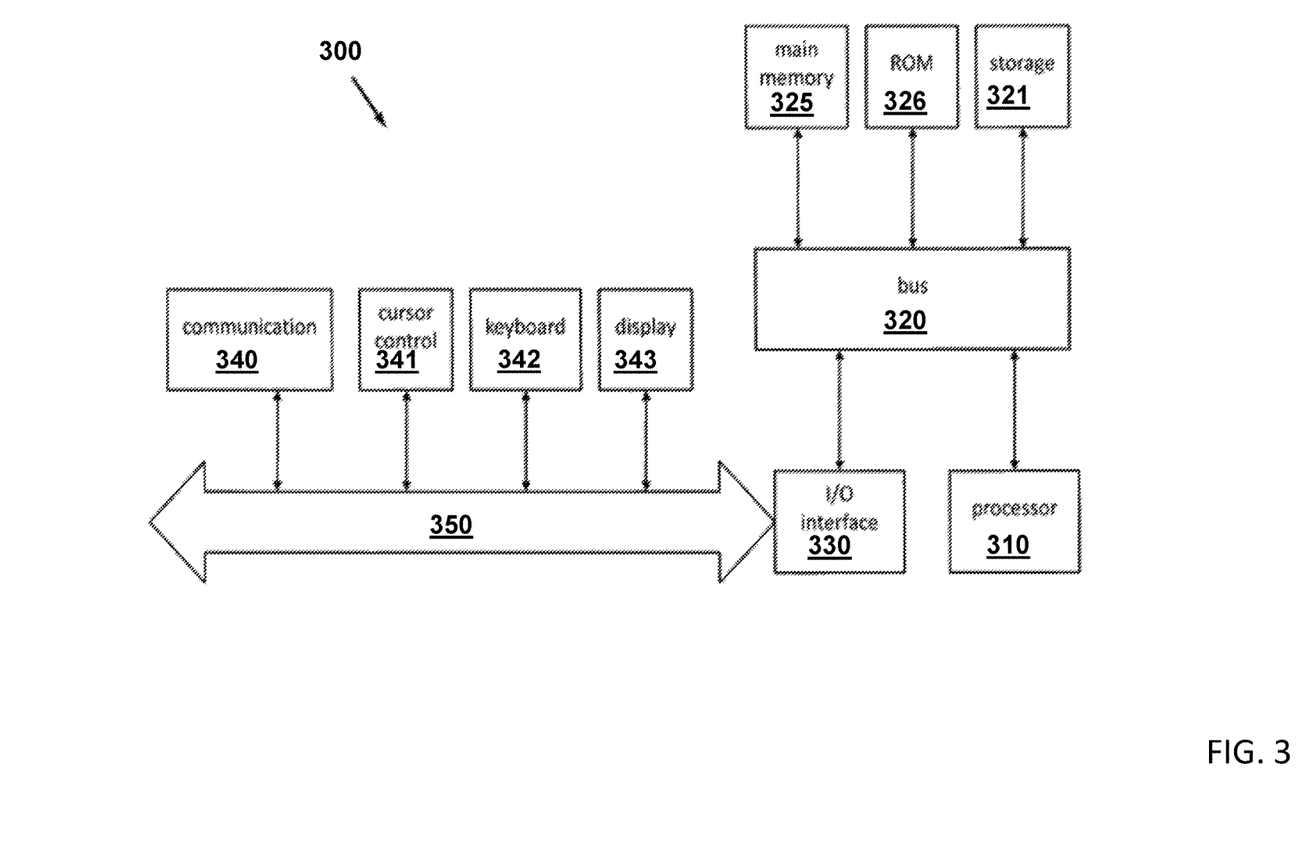
FIG. 3 illustrates an example computer architecture that may be used to implement embodiments of the present system and method, for example, the data storage system.

FIG. 3 illustrates an example computer architecture that may be used to implement embodiments of the present system and method, for example, the data storage system. The exemplary computer architecture may be used for implementing one or more components described in the present disclosure including, but not limited to, the user terminal and/or the proxy and data exchange platform servers. One embodiment of architecture 300 comprises a system bus 320 for communicating information, and a processor 310 coupled to bus 320 for processing information. Architecture 300 further comprises a random access memory (RAM) or other dynamic storage device 325 (referred to herein as main memory), coupled to bus 320 for storing information and instructions to be executed by processor 310. Main memory 325 also may be used for storing temporary variables or other intermediate information during execution of instructions by processor 310. Architecture 300 may also include a read only memory (ROM) and/or other static storage device 326 coupled to bus 320 for storing static information and instructions used by processor 310.

A data storage device 321 such as a magnetic disk or optical disc and its corresponding drive may also be coupled to architecture 300 for storing information and instructions. Architecture 300 can also be coupled to a second I/O bus 350 via an I/O interface 330. A plurality of I/O devices may be coupled to I/O bus 350, including a display device 343, an input device (e.g., an alphanumeric input device 342, a cursor control device 341, and/or a touchscreen device).

The communication device 340 allows for access to other computers (e.g., servers or clients) via a network. The communication device 340 may comprise one or more modems, network interface cards, wireless network interfaces or other interface devices, such as those used for coupling to Ethernet, token ring, or other types of networks.

Some portions of the detailed description herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the below discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms presented herein are not inherently related to any particular computer or other apparatus. Various general purpose systems, messaging servers, or personal computers may be used with programs in accordance with the teachings herein, or it may prove convenient to construct a more specialized apparatus to perform the required method steps. The required structure for a variety of these systems appears in the description above. A variety of programming languages may be used to implement the teachings of the disclosure as described herein.

Moreover, the various features of the representative examples and the dependent claims may be combined in ways that are not specifically and explicitly enumerated in order to provide additional embodiments of the present teachings. The dimensions and the shapes of the components shown in the figures are designed to help understand how the present teachings are practiced and do limit the dimensions and the shapes shown in the examples.

What is claimed is:

1. A data storage system configured as a node in a distributed data store, the data storage system comprising:
   an RDMA-enabled network adapter configured to communicate with one or more other data storage systems in the distributed data store; and
   a role management unit configured to:
      detect a node identification number associated with each of the one or more other data storage systems,
      compare a node identification number assigned to the data storage system with each of the detected node identification numbers to generate comparison results,
      determine whether the data storage system is to perform either a server role or a client role with respect to each of the one or more other data storage systems on the basis of the comparison results, and
      set up the network adapter to operate in both an RDMA server mode and an RDMA client mode in the same time period during runtime according to the determined roles,
   wherein in response to the determining and the setting up by the role management unit, the RDMA-enabled network adapter is configured to:
      initiate an RDMA reliable connection to establish a duplex communication channel with a first one of the one or more other data storage systems in response to the data storage system being determined to perform a client role with respect to the first one of the one or more other data storage systems; and
      in the same time period as the data storage system being determined to perform the client role, listen for incoming RDMA connections from a second one of the one or more other data storage systems in response to the data storage system being determined to perform a server role with respect to the second one of the one or more other data storage systems.

2. The data storage system of claim 1, wherein the generated comparison results indicate whether the node identification number assigned to the data storage system is greater or less than each of the detected node identification numbers.

3. The data storage system of claim 2, wherein the data storage system is determined to perform a server role with respect to a first one of the one or more other data storage systems in response to the node identification number assigned to the data storage system being less than the detected node identification number associated with the first one of the one or more other data storage systems.

4. The data storage system of claim 3, wherein the data storage system is determined to perform a client role with respect to a second one of the one or more other data storage systems in response to the node identification number assigned to the data storage system being greater than the detected node identification number associated with the second one of the one or more other data storage systems.

5. The data storage system of claim 2, wherein the data storage system is determined to perform a server role with respect to a first one of the one or more other data storage systems in response to the node identification number assigned to the data storage system being greater than the detected node identification number associated with the first one of the one or more other data storage systems.

6. The data storage system of claim 5, wherein the data storage system is determined to perform a client role with respect to a second one of the one or more other data storage systems in response to the node identification number assigned to the data storage system being less than the detected node identification number associated with the second one of the one or more other data storage systems.

7. A method of operating a data storage system configured as a node in a distributed data store, the method comprising:
  detecting a node identification number associated with each of one or more other data storage systems in the distributed data store,
  comparing a node identification number assigned to the data storage system with each of the detected node identification numbers to generate comparison results,
  determining whether the data storage system is to perform either a server role or a client role with respect to each of the one or more other data storage systems on the basis of the comparison results;
  setting up a network adapter of the data storage system to operate in both an RDMA server mode and an RDMA client mode in the same time period during runtime according to the determined roles;
  initiating an RDMA reliable connection to establish a duplex communication channel with a first one of the one or more other data storage systems in response to the data storage system being determined to perform a client role with respect to the first one of the one or more other data storage systems; and
  in the same time period as the data storage system being determined to perform the client role, listening for incoming RDMA connections from a second one of the one or more other data storage systems in response to the data storage system being determined to perform a server role with respect to the second one of the one or more other data storage systems.

8. The method of claim 7, wherein the generated comparison results indicate whether the node identification number assigned to the data storage system is greater or less than each of the detected node identification numbers.

9. The method of claim 8, wherein the data storage system is determined to perform a server role with respect to a first one of the one or more other data storage systems in response to the node identification number assigned to the data storage system being less than the detected node identification number associated with the first one of the one or more other data storage systems.

10. The method of claim 9, wherein the data storage system is determined to perform a client role with respect to a second one of the one or more other data storage systems in response to the node identification number assigned to the data storage system being greater than the detected node identification number associated with the second one of the one or more other data storage systems.

11. The method of claim 8, wherein the data storage system is determined to perform a server role with respect to a first one of the one or more other data storage systems in response to the node identification number assigned to the data storage system being greater than the detected node identification number associated with the first one of the one or more other data storage systems.

12. The method of claim 11, wherein the data storage system is determined to perform a client role with respect to a second one of the one or more other data storage systems in response to the node identification number assigned to the data storage system being less than the detected node identification number associated with the second one of the one or more other data storage systems.

13. A non-transitory, computer-readable medium having stored thereon computer executable instructions that, when executed by a computer processor of a data storage system configured as node in a distributed data store, cause the data storage system to:
  detect a node identification number associated with each of one or more other data storage systems in the distributed data store,
  compare a node identification number assigned to the data storage system with each of the detected node identification numbers to generate comparison results,
  determine whether the data storage system is to perform either a server role or a client role with respect to each of the one or more other data storage systems on the basis of the comparison results;
  set up a network adapter of the data storage system to operate in both an RDMA server mode and an RDMA client mode in the same time period during runtime according to the determined roles;
  initiate an RDMA reliable connection to establish a duplex communication channel with a first one of the one or more other data storage systems in response to the data storage system being determined to perform a client role with respect to the first one of the one or more other data storage systems; and
  in the same time period as the data storage system being determined to perform the client role, listen for incoming RDMA connections from a second one of the one or more other data storage systems in response to the data storage system being determined to perform a server role with respect to the second one of the one or more other data storage systems.

14. The non-transitory, computer-readable medium of claim 13, wherein the generated comparison results indicate whether the node identification number assigned to the data storage system is greater or less than each of the detected node identification numbers.

15. The non-transitory, computer-readable medium of claim 14, wherein the data storage system is determined to perform a server role with respect to a first one of the one or more other data storage systems in response to the node identification number assigned to the data storage system being less than the detected node identification number associated with the first one of the one or more other data storage systems.

16. The non-transitory, computer-readable medium of claim 15, wherein the data storage system is determined to perform a client role with respect to a second one of the one or more other data storage systems in response to the node identification number assigned to the data storage system being greater than the detected node identification number associated with the second one of the one or more other data storage systems.

17. The non-transitory, computer-readable medium of claim 14, wherein the data storage system is determined to perform a server role with respect to a first one of the one or more other data storage systems in response to the node identification number assigned to the data storage system being greater than the detected node identification number associated with the first one of the one or more other data storage systems.

18. The non-transitory, computer-readable medium of claim 17, wherein the data storage system is determined to perform a client role with respect to a second one of the one or more other data storage systems in response to the node identification number assigned to the data storage system being less than the detected node identification number associated with the second one of the one or more other data storage systems.

* * * * *